United States Patent [19]
Ross, Jr.

[11] 3,815,515
[45] June 11, 1974

[54] SCREW ACTUATED HOPPER GATE
[75] Inventor: Irving D. Ross, Jr., Barrington, Ill.
[73] Assignee: The Youngstown Steel Door Company, Cleveland, Ohio
[22] Filed: Aug. 14, 1972
[21] Appl. No.: 280,581

[52] U.S. Cl. ............ 105/282 R, 74/424.8, 105/307, 222/504
[51] Int. Cl. ......... B61d 7/02, B61d 7/20, B61d 7/26
[58] Field of Search ........ 74/424.8; 105/282 R, 307; 222/504

[56] References Cited
UNITED STATES PATENTS
1,829,182 10/1931 Beaumont .......................... 222/504
3,203,269 8/1965 Perrine .............................. 74/424.8

Primary Examiner—Lloyd L. King
Assistant Examiner—Howard Beltran
Attorney, Agent, or Firm—Fay, Sharpe and Mulholland

[57] ABSTRACT

A screw actuated hopper gate assembly is provided for use on gravity discharge railroad hopper cars. The assembly includes a hopper, a plurality of flanges which extend from the hopper to receive and support a movable gate, a plurality of frame members which assist in supporting the movable gate and give rigidity to the entire assembly, an axially fixed rotatable screw which is totally enclosed so as to prevent it from clogging during operation thereof, with the screw driving a nut fixedly attached to the gate for straight line forward and backward movement thereof, and a means for causing the screw to rotate.

10 Claims, 5 Drawing Figures

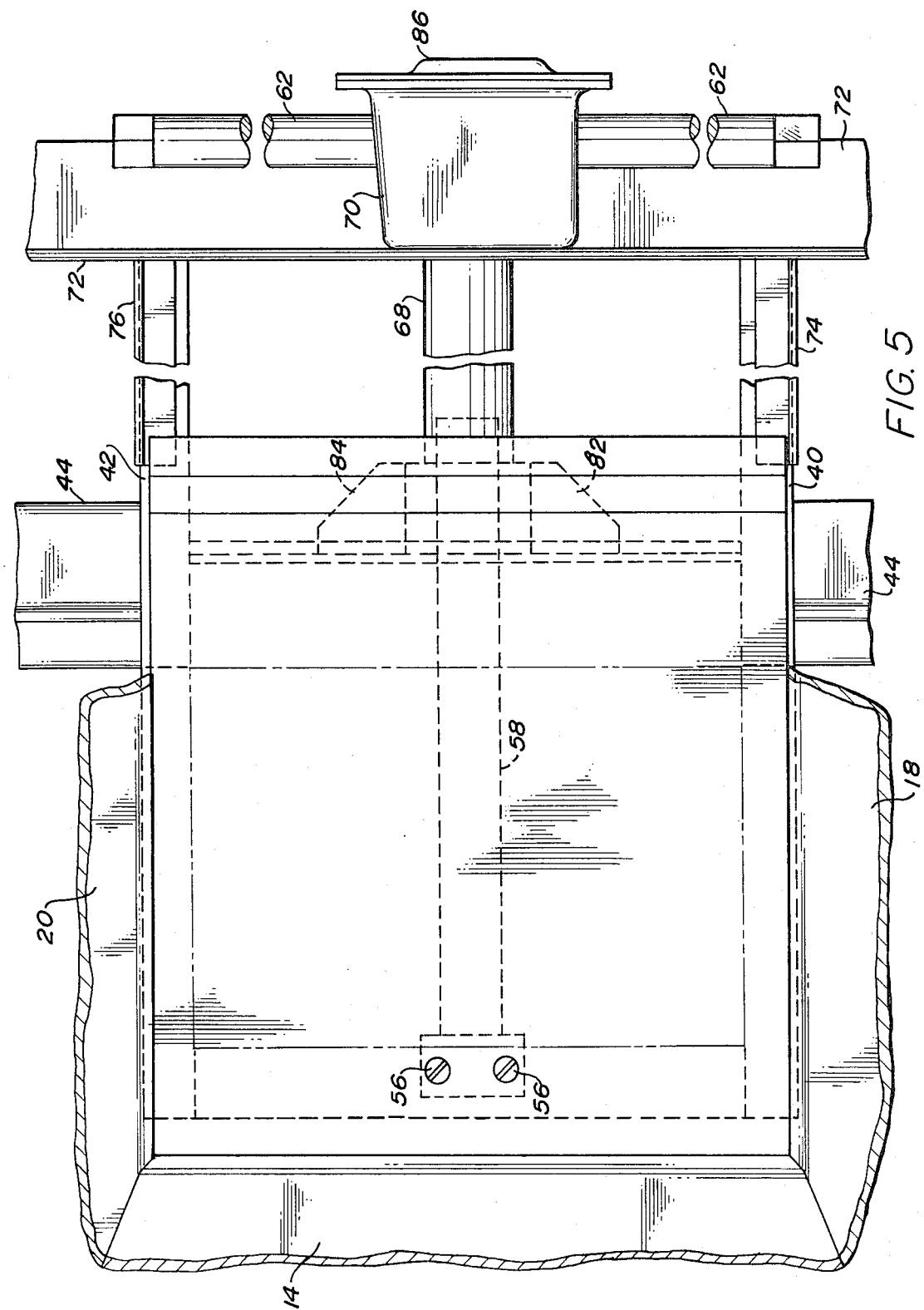

SCREW ACTUATED HOPPER GATE

FIELD OF THE INVENTION

The present invention relates to a screw actuated hopper gate assembly which is especially adapted for use in connection with gravity discharge railroad hopper cars. More particularly, it concerns a screw driven hopper gate assembly which is designed so that there is little, is any, chance of the gate jamming or the screw fouling during the opening and/or closing of the movable hopper gate.

SUMMARY OF THE INVENTION

The present invention concerns a screw actuated gravity discharge hopper gate assembly which comprises a hopper having downwardly sloping front, rear and side walls terminating in an opening therein; a front flange member fixedly attached to the front wall; side flanges fixedly attached to the side walls; a rear flange member fixedly attached to the rear wall; a movable gate positioned in close proximity to the opening and adapted to be supported by the front flange and the side flange, the movable gate including a flat plate member having affixed thereto a first elongated closed wall housing with one end of said housing having nut means secured thereto, a rotationally driven axially fixed screw threadedly engaging said nut means such that rotation of the screw causes the gate to move in a straight path as the nut means traverses its length, and a second elongated closed wall housing surrounding the screw. The first and second elongated closed wall housings each being of cross-sectional shape and size and in longitudinal alignment such that the first elongated closed wall housing and the nut means secured thereto can be substantially telescopically received in said second closed wall housing thereby insuring that during operation of said gate, as said nut moves along said screw in a rearward direction to open said gate assembly opening or in a forward direction to close said gate assembly opening, said first and second housings will prevent clogging of said screw and nut threads due to the introduction of undesirable material into the cavity formed thereby to insure that it does not clog or jam when rotationally driven in either direction by means in communication therewith to open and close the gate as desired.

A hopper gate assembly constructed as above-described offers certain combined advantages which were heretofore unobtainable in any known single prior art device. For example, the hopper gate assembly of the invention is constructed in such a manner that there is little, if any, chance of the track on which the hopper gate moves becoming warped or twisted so that the movement of the gate to the open or closed position is impeded by the gate becoming cocked or travelling in other than a straight path. In addition, the means for stopping the forward and rearward movement of the gate of the invention is effected by simple physical contact between the appropriate component parts of the present apparatus, thereby eliminating the need for such devices as limit switches and the like which have been used in prior art devices even though they present certain operational and maintenance problems.

Also, and perhaps most importantly, the present invention provides a screw actuated hopper gate assembly which is designed in such a manner that the screw virtually cannot become jammed or clogged by material being discharged from the hopper or by other forgeign matter. This feature is accomplished by fixedly attaching a hollow, tubular member at one end thereof to the underside of the gate proper with the other end of the tubular member having a means for engaging the screw which, in turn, is itself enclosed in a second suitable housing which communicates with the first hollow, tubular member in a telescoping manner.

By utilizing a screw actuated hopper gate assembly fabricated according to the teachings of the invention it is possible to avoid many of the operational and constructional difficulties associated with the various prior art devices. Accordingly, it is the principal object of the instant invention to provide a novel screw actuated hopper gate assembly which has a minimum of operational difficulties associated with its use by the railroad industry.

Other objects of the invention and the means of accomplishing them will be apparent to those skilled in the art from a reading of the following description and claims.

BRIEF DESCRIPTION OF THE DRAWINGS

FIG. 5 is a plan view of the screw actuated hopper gate assembly of the invention taken along line 4—4 of FIG. 1.

DESCRIPTION OF THE PREFERRED EMBODIMENTS

Figure 1:
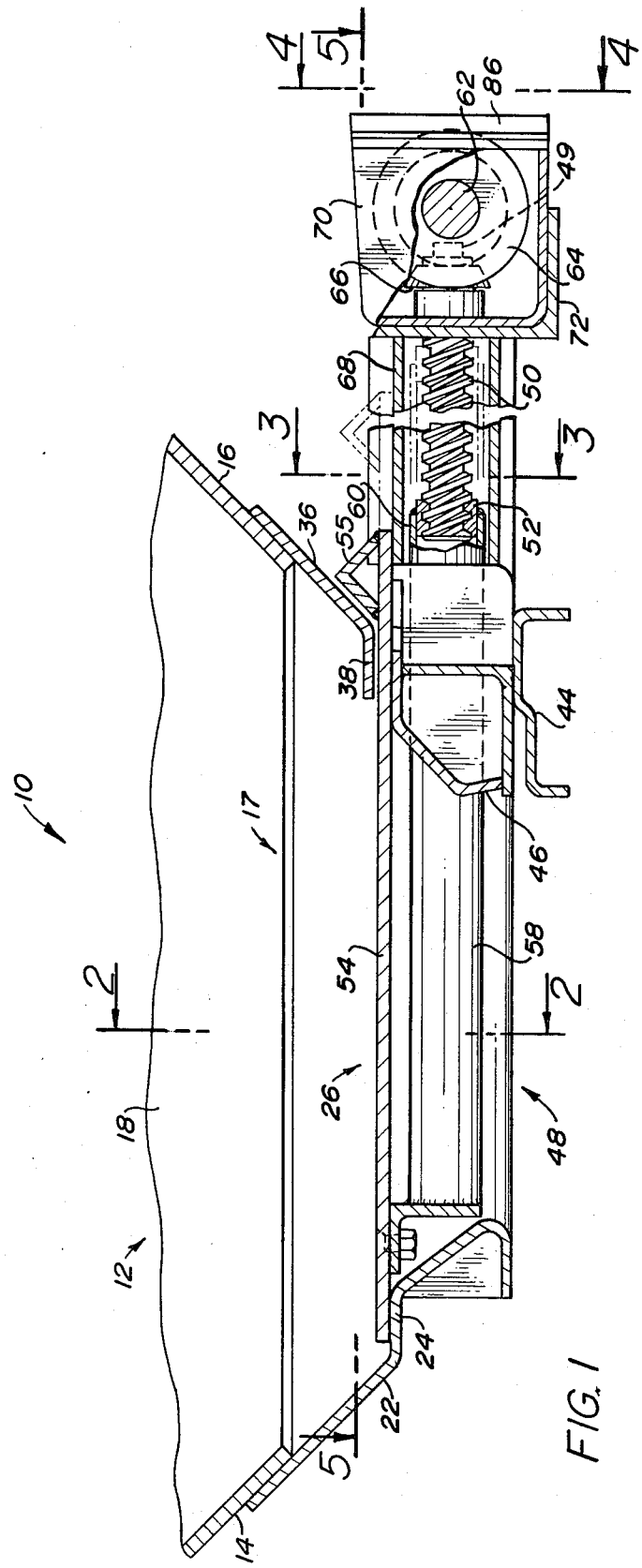
FIG. 1 is a partly broken away, vertical sectional view of the screw actuated hopper gate assembly of the invention.
Figure 2:
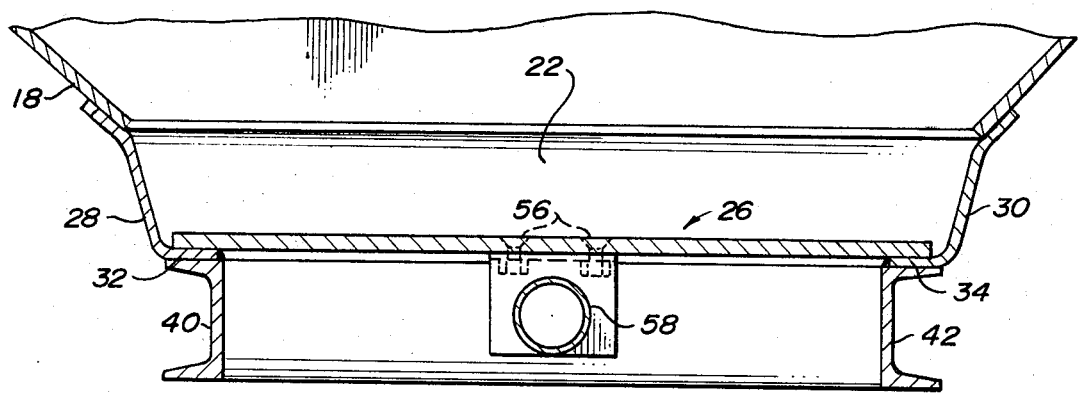
FIG. 2 is a vertical sectional view of the screw actuated hopper gate assembly of the invention taken along line 2—2 of FIG. 1.

Referring now in detail to the drawings, in which like parts are designated by like numerals, there is shown the screw actuated hopper gate assembly of the invention which is designed and constructed in such a manner that there is little, if any, chance of the gate travelling in other than a straight path or the screw mechanism becoming clogged or jammed as material is discharged by gravity from the hopper.

The screw actuated hopper gate assembly of the invention is generally designated by the numeral 10. It consists of a hopper 12 having oppositely sloping front and back side walls 14 and 16 and first and second side walls indicated at 18 and 20, respectively, which terminate in a rectangularly shaped opening 17. Fixedly attached to front side wall 14 is front flange member 22 having an upwardly facing flat seat 24 adapted to receive and support the leading edge of gate 26. Likewise, fixedly attached to side walls 18 and 20 are first and second side flange members 28 and 30, respectively. These first and second side flange members, like front flange 22, are provided with upwardly facing flat seats 32 and 34, respectively, which are adapted to receive and support the side portions of movable gate 26. Fixedly attached to the back wall 16 of hopper 12 is a rear flange member 36 which has a forwardly extending flat protrusion 38 that is adapted to form a slidable seal with movable gate 26 when it is in the fully closed position.

First and second side flange members 28 and 30 are fixedly attached to first and second frame members 40 and 42, respectively, to add to the rigidity of the screw actuated hopper gate assembly. Also, extending at essentially right angles to the first and second frame members and fixedly attached thereto is a first cross member support 44. This first cross member support has fixedly attached thereto rear flange extension member 46. As can be seen, first and second frame members 40 and 42, together with the lower portion of front flange member 22 and rear flange extension 46, define the outlet port 48 through which material is removed from the hopper.

The opening and closing of the outlet port 48 is controlled by movable gate 26 which for straight line movement communicates with screw 50 through nut 52. The movable gate 26 consists of a flat plate member 54 having fixedly attached to its underside at one end thereof, by means of nut and bolt combinations 56, a hollow tubular housing 58 which at end 60 is fixedly connected to movable nut 52. Accordingly, when the screw 50 is rotated in the proper direction, nut 52 rides along the screw carrying with it in a perfectly straight path hollow housing 58 and flat plate member 54, i.e., the movable gate 26. The flat plate member 54 is provided with a triangularly shaped angle member 55 which mates against rear flange 36 when the gate 26 is in the closed position.

The screw 50 is driven by a selectively rotated shaft 62 which is fixedly connected to a bevelled bull gear 64 which, in turn, is meshed with bevelled pinion gear 66 fixedly mounted on stub end 49 of screw 50.

To insure that the screw actuated gate assembly of the instant invention operates in an essentially flawless manner, screw 50 is encased in a hollow cylindrical housing 68. Accordingly, screw 50 is either enclosed by tubular housing 58 or housing 68 as these respective housings communicate in a telescoping manner and thus it is virtually impossible, under normal operating conditions, for the screw actuated outlet gate of the invention to become clogged or jammed during use.

To provide structural integrity for the device of the instant invention, the pinion and bull gear arrangement is positioned in a suitable enclosure 70 which is supportably mounted on second cross member 72. The stub end 49 of screw 50 passes through openings in the wall of enclosure 70 and support member 72 and has mounted thereon, between the wall and pinion gear 66, a thrust bearing 51. Like the first cross member 44, the second cross member 72 is fixedly attached to the first and second frame members 40 and 42, respectively.

Figure 3:
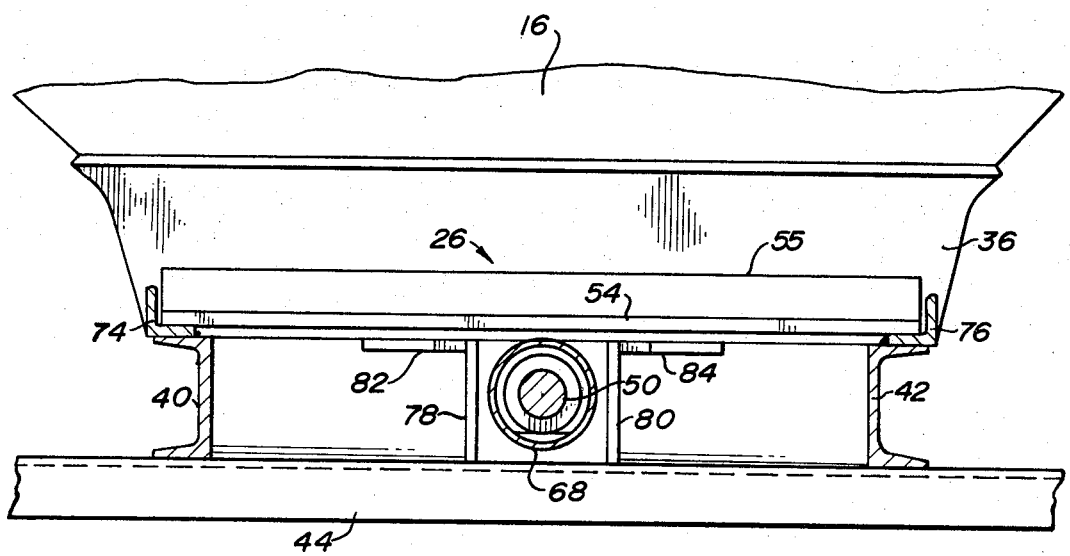
FIG. 3 is a vertical sectional view of the screw actuated hopper gate assembly of the invention taken along line 3—3 of FIG. 1.

As can be seen in FIG. 3, first and second L-shaped guide bars 74 and 76, respectively, are fixedly mounted on the upper surface of the first and second frame members between the first and second cross member in such a fashion that they form a track or guide to insure straight line movement of the flat plate member 54 of the screw actuated gate 26 as it is moved into the open position.

In addition, as noted in the accompanying drawings, in order to provide added support for movable gate 26, vertical first and second support members 78 and 80, respectively, are provided. In actual practice, the lower end of the both vertical support members is fixedly attached to first cross member 44 while the upper ends thereof are fixedly attached to first and second horizontal support members 82 and 84, respectively. As can be seen from FIGS. 1 and 5, these vertical and horizontal support members are fixedly attached to rear flange extension member 46, thereby giving added rigidity to the total screw actuated hopper gate assembly of the invention.

Figure 4:
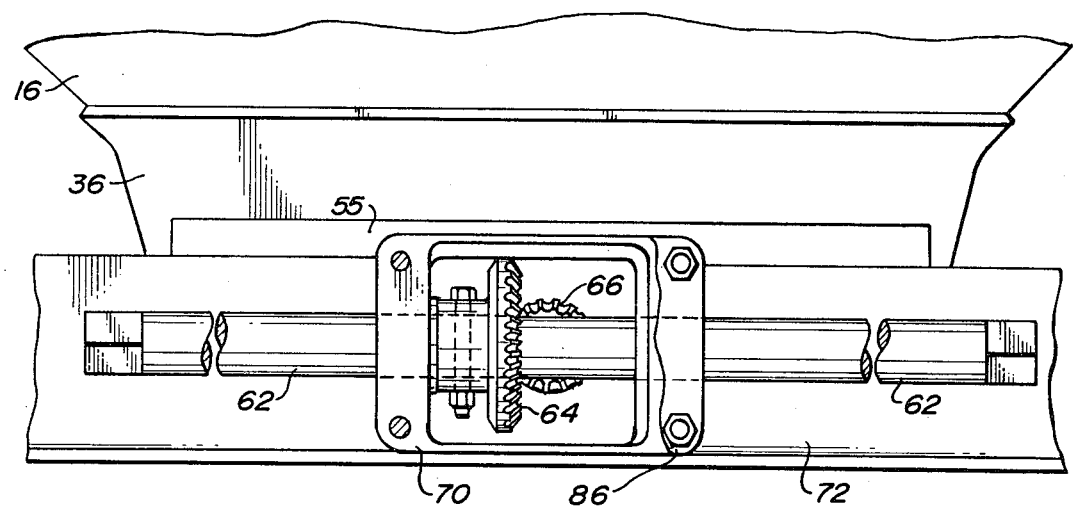
FIG. 4 is a vertical sectional view of the screw actuated hopper gate assembly of the invention taken along line 4—4 of FIG. 1.

It is noted in FIG. 4 that access to the pinion and bull gear arrangement is easily obtained by simply removing face plate 86. This constructional feature makes it very easy for one to inspect and/or lubricate the gear assembly as desired. As will be recognized by those skilled in the art, the gears are removably affixed to shaft 62 and stub end 49 for maintenance and/or replacement when needed.

In practice, it has been found to be preferable to use a one inch lead Acme type thread for the screw; however, other sizes and types of threads may be used in the practice of the instant invention without departing from its spirit and reasonable scope. In addition, it should be noted here that in the practice of the subject invention, it is desirable to pack the pinion and bull gear in a suitable grease. In fact, in actual operation it is preferred to completely fill the pinion and bull gear enclosure 70 with grease so that the thrust bearing 51 is also packed in grease. When the hopper gate assembly of the invention is mounted for use on a railroad hopper car, the shaft 62 preferably extends transverse to the car length and the screw 50 extends parallel to the car length. In the preferred embodiment both ends of shaft 62 are provided with a square or hexagonal cross-section for engagement with a conventional pneumatic wrench for selective rotation of shaft 62 for opening and closing the gate as desired.

From the foregoing description, it will be readily apparent to those skilled in the art that various modifications may be made in the design and construction described herein in detail without departing from the reasonable scope of the hereinafter claimed invention.

What is claimed is:

1. A hopper gate assembly comprising a hopper having downwardly sloping front, rear and side walls terminating in an opening therein;
a front flange member fixedly attached to said front wall;
said flanges fixedly attached to said side walls;
a rear flange member fixedly attached to said rear wall;
a movable gate positioned in close proximity to the said opening and adapted to be supported by said front flange and said side flanges, said movable gate including a flat plate member having a first elongated closed wall housing affixed thereto with one end of said housing having a nut means secured thereto for engaging a screw which when rotated can cause the gate to move;
an axially fixed screw threadedly communicating with said nut means for movement of said gate, said screw having a second elongated closed wall housing therearound;
the said first and second elongated closed wall housings each being of cross-sectional shape and size in longitudinal alignment such that the first elongated closed wall housing and the nut means secured thereto can be substantially telescopically received in said second closed wall housing thereby insuring that during operation of said gate, as said nut moves along said screw in a rearward direction to open said gate assembly opening or in a forward direction to close said gate assembly opening, said first and second housings will prevent clogging of said screw and nut threads due to the introduction of undesirable material into the cavity formed thereby; and a means for selectively rotating said axially fixed screw whereby said gate can be opened or closed as desired.

2. The screw actuated hopper gate assembly of claim 1 wherein said opening formed by said front, rear and side walls is generally rectangular in shape.

3. The screw actuated hopper gate assembly of claim 2 wherein said front flange and said side flanges have an upwardly facing flat seat adapted to receive and support said movable gate.

4. The screw actuated hopper gate assembly of claim 3 wherein said movable gate is supported by a rear flange extension member.

5. The screw actuated hopper gate assembly of claim 4 wherein said side flanges are mounted on side frame members for support.

6. The screw actuated hopper gate assembly of claim 5 wherein said side frame members are fixedly connected to a first cross member for support.

7. The screw actuated hopper gate assembly of claim 6 wherein said screw is provided with one inch lead Acme threads.

8. The screw actuated hopper gate assembly of claim 7 wherein said means for actuating said screw comprises a pinion and bull gear arrangement connected to said screw, with said bull gear communicating with a rotatable shaft for transmitting motion to said screw.

9. The screw actuated hopper gate assembly of claim 8 wherein said rotatable shaft is adapted to be engaged by a pneumatic device capable of imparting rotary motion to said shaft.

10. The screw actuated hopper gate assembly of claim 9 wherein said housing which is attached to said flat plate member of said gate communicates with said housing which encloses said screw in a telescoping manner.

* * * * *

UNITED STATES PATENT OFFICE
CERTIFICATE OF CORRECTION

Patent No. 3,815,515     Dated June 11, 1974

Inventor(s) Irving D. Ross, Jr.

It is certified that error appears in the above-identified patent and that said Letters Patent are hereby corrected as shown below:

IN THE SPECIFICATION:

Column 1, line 10, change "is" to -- if --.

Column 2, line 3, change "geign" to -- eign --.

IN CLAIM :

Column 4, line 47, change "said" to -- side --.

Column 4, line 63, insert -- and -- after "size" and before "in".

Signed and sealed this 10th day of December 1974.

(SEAL)
Attest:

McCOY M. GIBSON JR.　　　　　　　　C. MARSHALL DANN
Attesting Officer　　　　　　　　　Commissioner of Patents